United States Patent
Lang et al.

(10) Patent No.: US 12,423,156 B2
(45) Date of Patent: Sep. 23, 2025

(54) MANAGING WORKLOADS IN A CONTAINER ORCHESTRATION SYSTEM

(71) Applicant: International Business Machines Corporation, Armonk, NY (US)

(72) Inventors: Jakob Christopher Lang, Walddorfhäslach (DE); Utz Bacher, Dettenhausen (DE)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 18/169,392

(22) Filed: Feb. 15, 2023

(65) Prior Publication Data
US 2024/0202040 A1 Jun. 20, 2024

(30) Foreign Application Priority Data
Dec. 19, 2022 (GB) .................................... 2219161

(51) Int. Cl.
*G06F 9/50* (2006.01)

(52) U.S. Cl.
CPC ............ *G06F 9/505* (2013.01); *G06F 9/5077* (2013.01)

(58) Field of Classification Search
CPC ...................................................... G06F 9/505
See application file for complete search history.

(56) References Cited

U.S. PATENT DOCUMENTS

| 9,141,432 B2 * | 9/2015 | Chen ....................... G06F 9/505 |
| 11,245,748 B1 | 2/2022 | Hannon |

(Continued)

FOREIGN PATENT DOCUMENTS

| CN | 110704186 A | 1/2020 |
| CN | 114138467 A | 3/2022 |
| CN | 114615268 A | 6/2022 |

OTHER PUBLICATIONS

Anonymous, "Create and configure an Azure Kubernetes Services (AKS) cluster to use virtual nodes in the Azure portal", Microsoft Docs, May 26, 2022, 7 pages, <https://learn.microsoft.com/en-us/azure/aks/virtual-nodes-portal>.

(Continued)

*Primary Examiner* — Charlie Sun
(74) *Attorney, Agent, or Firm* — Michael A. Petrocelli

(57) ABSTRACT

A computer-implemented method of using a workload management system designed for workloads of a first computing architecture as well as for workloads of a second computing architecture is disclosed. The method comprises deploying a workload management control plane under a first computing architecture, identifying, by the workload management control plane, a requested remote workload only available for the second computing architecture, creating, by the workload management control plane, a proxy compute resource as interface for the requested remote workload, starting, by the proxy compute resource, the remote workload, controlling, by the proxy compute resource, an operation of the remote workload in a 1:1 relationship, by: upon receiving a termination signal, terminating the remote workload by the proxy compute resource and self-terminating the proxy compute resource, and upon a termination of the remote workload terminate the proxy compute resource.

20 Claims, 5 Drawing Sheets

(56) References Cited

U.S. PATENT DOCUMENTS

| | | | |
|---|---|---|---|
| 2012/0054770 A1 | 3/2012 | Krishnamurthy | |
| 2016/0328269 A1* | 11/2016 | Minor | G06F 9/5044 |
| 2020/0250006 A1 | 8/2020 | Parekh | |
| 2022/0012089 A1 | 1/2022 | Nasr-Azadani | |

OTHER PUBLICATIONS

Anonymous, "Kata Containers—Open Source Container Runtime Software", Kata Containers, downloaded from the Internet on Jan. 2, 2023, 4 pages, <https://katacontainers.io/>.

Anonymous, "Virtual kubelet of virtual machine management technology in the post kubernetes Era", Chowdera, Aug. 31, 2021, 7 pages, <https://chowdera.com/2021/08/20210831223037224k.html>.

Kianwei, "Deploy Virtual Nodes Quickly with Container Service for Kubernetes", Alibaba Cloud Community, Apr. 11, 2019, 10 pages, <https://www.alibabacloud.com/blog/deploy-virtual-nodes-quickly-with-container-service-for-kubernetes_594680>.

Foreign Search Report, Patents Act 1977: Search Report under Section 17(5) Application No. GB2219161.3, Dated Jun. 9, 2023.

\* cited by examiner

MANAGING WORKLOADS IN A CONTAINER ORCHESTRATION SYSTEM

BACKGROUND

Field of the Invention

The invention relates generally to a method for operating a workload management system, and more specifically, to a computer-implemented method of using a workload management system designed for workloads of a first computing architecture as well as workloads of a second computing architecture. The invention further relates to a related workload management system designed for workloads of a first computing architecture enabled for a workload of a second computing architecture, and to a computer program product.

Related Art

Intelligent workload management in the highly complex computing environments of today's enterprise and government data centers has always been a challenging task. In order to ensure a good utilization rate of the available resources, the workloads should be distributed across the available hardware systems to provide users with good service—e.g., response times—and ensure a sufficiently good availability for peak batch jobs, e.g., typically at the end of the month, a quarter or a year.

Modern cloud computing technology has solved a lot of the existing problems. Workload high availability has been solved with the introduction of availability zones, which can address power outages or network unavailability. The introduced technology also enables state reconciliation, i.e., automatically restarting what failed during the execution; and network availability has been significantly increased through the introduction of load balancers and health checks of the components used. At the same time, the demand for a 24×7 operational availability has been increased through e-commerce platforms and just-in-time production schedules.

The introduction of cloud computing was also enabled by massive virtualization of resources which in turn led to the advent of software containers, essentially, a lightweight virtual machine. The associated container management is available in several flavors, one of which is denoted as Kubernetes. However, not all workloads required in the industry are available under computing architectures that completely support the coordinators technology. Some of the required workload types may only be available under a computing architecture currently not compatible with computing architectures supporting coordinators.

In this context, a couple of documents have been published already. Document CN114138467A a capability automatic adjustment system and a related method. It describes a Pod cluster, a monitoring module and a deployment module, wherein the Pod cluster comprises at least one Pod which comprises a proxy container and at least one business container. It is described in the context of Kubernetes. Additionally, document US2020/0250006 A1 describes a container management for receiving a deployment specification for operating an application within a container management system. It describes also a determination whether the deployment specification includes a specific workload for scheduling the application and a determination in response to the deployment specification not including a specific workload for scheduling the application, a workload ratio associated with the application.

Therefore, there is a need to use workloads that are only available on a second, non-Kubernetes compatible computing platform through a Kubernetes workload management. Or more generally, there is a need for a workload management system capable of managing computing workloads operational under incompatible computing architectures.

SUMMARY

According to one aspect of the present invention, a computer-implemented method for using a workload management system designed for workloads of a first computing architecture also for workloads of a second computing architecture may be provided. The method may comprise deploying a workload management control plane under a first computing architecture, identifying, by the workload management control plane, a requested remote workload only available for the second computing architecture, creating, by the workload management control plane, a proxy compute resource as interface for the requested remote workload, and starting, by the proxy compute resource, the remote workload.

Moreover, the method may comprise controlling, by the proxy compute resource, an operation of the remote workload in a 1:1 relationship, by (i) upon receiving a termination signal, terminating the remote workload by the proxy compute resource and self-terminating the proxy compute resource, and (ii) upon a termination of the remote workload terminate the proxy compute resource.

According to another aspect of the present invention, a workload management system designed for workloads of a first computing architecture enabled for a workload of a second computing architecture may be provided. The system may comprise a processor and a memory, the memory being operatively coupled to the processor, wherein the memory stores program code portions, which, when executed by the processor, enable the processor to deploy a workload management control plane under a first computing architecture, identify, using the workload management control plane, a requested remote workload only available for the second computing architecture, create, using the workload management control plane, a proxy compute resource as interface for the requested remote workload, and start, using the proxy compute resource, the remote workload.

Additionally, the processor may be enabled to control, using the proxy compute resource, an operation of the remote workload in a 1:1 relationship, by: (i) upon a reception of a termination signal, terminating the remote workload by the proxy compute resource and self-terminating the proxy compute resource, and (ii) upon a termination of the remote workload terminate the proxy compute resource.

The proposed computer-implemented method for using a workload management system designed for workloads of a first computing architecture also for workloads of a second computing architecture may offer multiple advantages, technical effects, contributions and/or improvements:

Using the proposed concept, users may be enabled to use the advantages of a proven workload management system being executable on a first computing architecture also for a second computing architecture on which the workload management system is not available.

If, e.g., the first computing architecture is based on the x86 architecture and the second computing architecture is the zSystems architecture, also remote workloads on the zSystems-architectured computer system may be managed using, e.g., Kubernetes which is one example of the workload management system executable on the first computing architecture. Of course, remote workloads of other architectures may also be supported by the concept proposed here. Thereby, the Kubernetes semantics can be fully used; this may also apply to all continuity and resilience attributes and capabilities of a Kubernetes container management system.

On the other side, the integrated architecture of the workload management system controlling both, workloads under the first computing architecture and workloads under the second computing architecture, may also benefit from the high availability attributes of, e.g., a computer system using the zSystems—also known as mainframe—architecture. Additionally, the workloads on the zSystems side may be HPVS (Hyper Protect Virtual Server) or zVSI (zSystems Virtual Service Instance) workloads.

Because the remote workload may also be another workload management system running under the second computing architecture, portions of the workload management for a plurality of remote resources may be performed by the other workload management system.

Using the 1:1 relationship between the proxy compute resource and the remote workload, it may also be ensured that not any remote workload artifacts may exist even if the proxy compute resource—e.g., a pod in the nomenclature of Kubernetes—may remain uncontrolled after a failure.

The approach proposed here ensures that the proxy compute resource—also denotable as control pod—to control the remote workload may be created in a form and with resources to route network access or allow access to other peripheral devices (e.g., a hardware security module, secure storage and the like). Hence, for the remote workload the used approach may be completely transparent. Also, from the point of view of the workload management system running under the first computing architecture the process may be completely transparent since the details of controlling the remote workload may be hidden in the proxy compute resource. Hence, the Kubernetes control plane may be used without any changes.

The 1:1 relationship may even apply when the proxy compute resource is a container, and the remote workload consists of anything else than a container—e.g. a virtual machine. This can be beneficial even if the first and the second computing architecture are the identical.

It shall also be mentioned that it does not have to be excluded that the first architecture and the second architecture are identical. I.e., the first architecture and the second architecture may be x86 based. This way it may become elegantly possible to manage traditional VMs (virtual machines) with Kubernetes.

This way, limitations of traditional solution like Kata (compare https://katacontainers.io), Crossplane or virtual kubelets may be elegantly overcome. Additional advantageous may also be that the function available as remote workload has not to be reprogrammed for an operation under the first computing architecture. This may be the same time and resources. Additionally, potential errors in the system by reprogramming may also be avoided.

In the following, additional embodiments of the inventive concept—applicable for the method as well as for the system—will be described.

According to an advantageous embodiment, the method may comprise continuously monitoring a correct operation of the remote workload by the proxy compute resource. Hence, a permanent health check may be performed not only for the remote workload but also for the relationship between the proxy compute resource and the remote workload.

According to a preferred embodiment, the method may also comprise, forwarding network traffic to and from the remote workload by the proxy compute resource. Therefore, from the network traffic point of view, the proposed concept may be completely transparent to the outside as well as transparent to the container management platform, since the initial interface of the network traffic may be the proxy compute resource which interfaces to the network and thereby represent the remote workload.

According to a useful embodiment of the method, the starting the remote workload also may also comprise starting the remote workload with the same deployment characteristics as specified by the received request. The same deployment characteristics may, e.g., be a same availability zone for the requested workload.

According to another advantageous embodiment of the method, the starting the remote workload may also comprise ensuring availability of resources required by the proxy compute resource to operate the remote workload. In case of virtual resources, the resources may be created. In other cases—like a physical network, a physical storage system, an HSM—the physical availability should be ensured. In this way, the proxy compute resource may present itself to the workload management control plane as if the proxy compute resource is delivering the requested workload itself instead of some other system on which the remote workload may be executed.

According to an advanced embodiment of the method, the starting the remote workload may also comprise: upon determining an executing related remote workload, terminating the determined executing related remote workload with all associated resources. This may enable a clean start of the remote workload. Assuming the case that the proxy compute resource may have previously started the remote workload and the proxy compute resource may have been terminated unexpectedly, a restarted proxy compute resource would also start a new remote workload. Hence, the two workload executing entities work again in a 1:1 relationship.

According to a further interesting embodiment of the method, the first computing architecture may be an x86 architecture. For the x86 architecture, a series of workload management systems is available in the industry, most of which may have a large user community. This may also apply to the container workload management denoted as Kubernetes. However, Kubernetes is not available on each and every platform for a container management. Therefore, it may be advantageous if the x86 Kubernetes implementation may also be usable for workloads residing on other computing architectures, e.g., the zSystems architecture.

Hence, and according to a permissive embodiment of the method, the second computing architecture may be a zSystems architecture. Furthermore, also other computing architectures may be used as second computing architecture, like an ARM architecture, Power architecture, or other more seldom used computing architectures. Hence, while the second computing architecture may execute the remote workload, the workload management system executed on the first computing architecture may be used seamlessly to also manage the workload of the second computing architecture.

According to an interesting embodiment of the method, the workload management system may be a container management platform. One example may be the known Kubernetes container management system. It should also be mentioned that also the remote workload may be container-based or alternatively a non-container based workload management system, e.g., for virtual machines or virtual machines themselves or even a natively running operating system without any virtualization.

According to another enhanced embodiment of the method, a request of the remote workload to a storage system or I/O attachments—e.g., a hardware security module (HSM)—may be forwarded to and performed by the proxy compute resource. This may be a similar concept to network traffic forwarding, discussed above. One may also say that the remote workload may be represented by the remote proxy computing resource.

Furthermore, embodiments may take the form of a related computer program product, accessible from a computer-usable or computer-readable medium providing program code for use by or in connection with a computer or any instruction execution system by or in connection with a computer or any instruction execution system. For the purpose of this description, a computer-usable or computer-readable medium may be any apparatus that may contain means for storing, communicating, propagating or transporting the program for use by or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention are apparent from the examples of embodiments to be described hereinafter and are explained with reference to the examples of embodiments, to which the invention is not limited.

Figure 1:
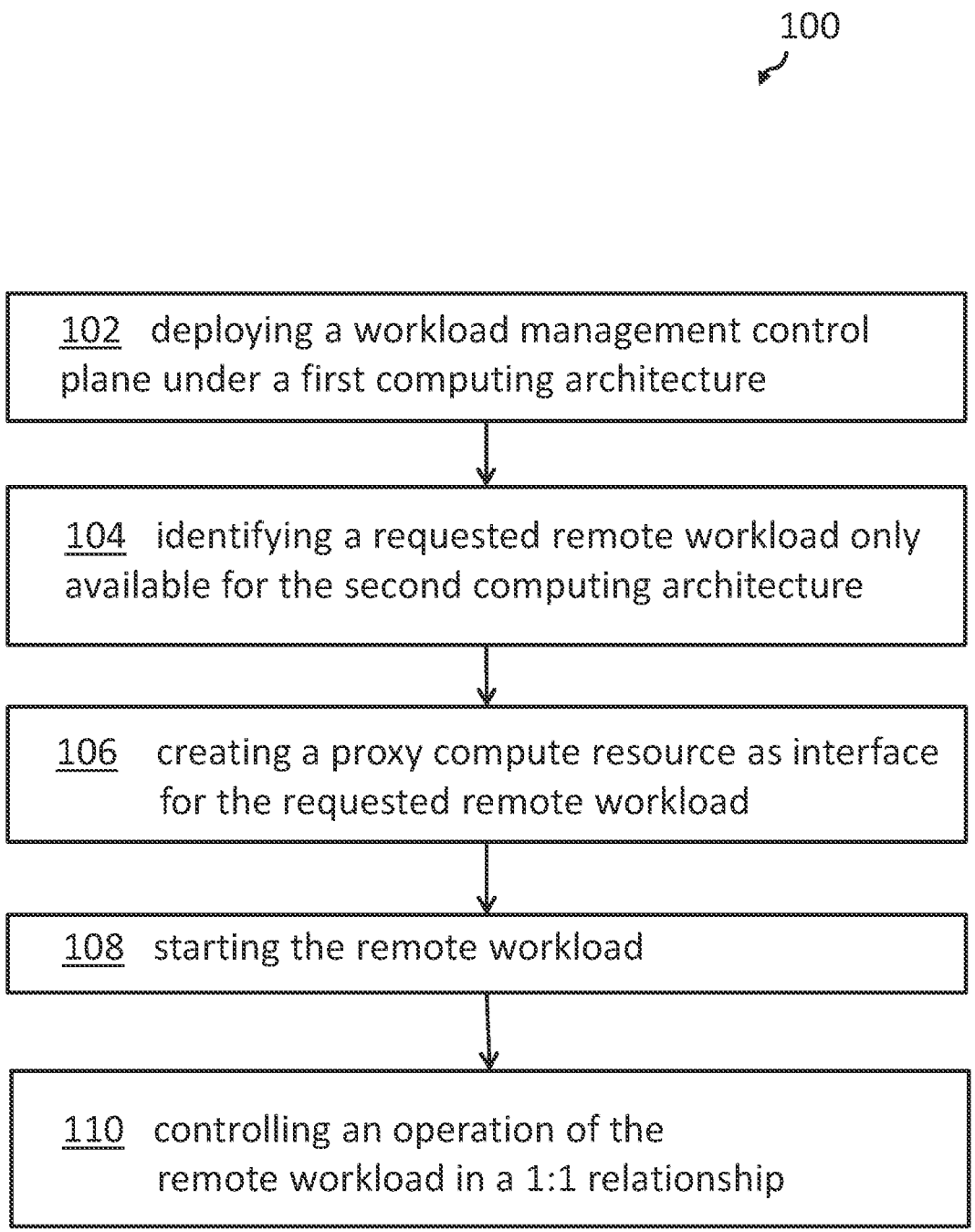

Preferred embodiments of the invention will be described, by way of example only, and with reference to the following drawings:

FIG. 1 shows a block diagram of an embodiment of the inventive computer-implemented method for using a workload management system which is designed for workloads of a first computing architecture as well as for workloads of a second computing architecture.

Figure 2:
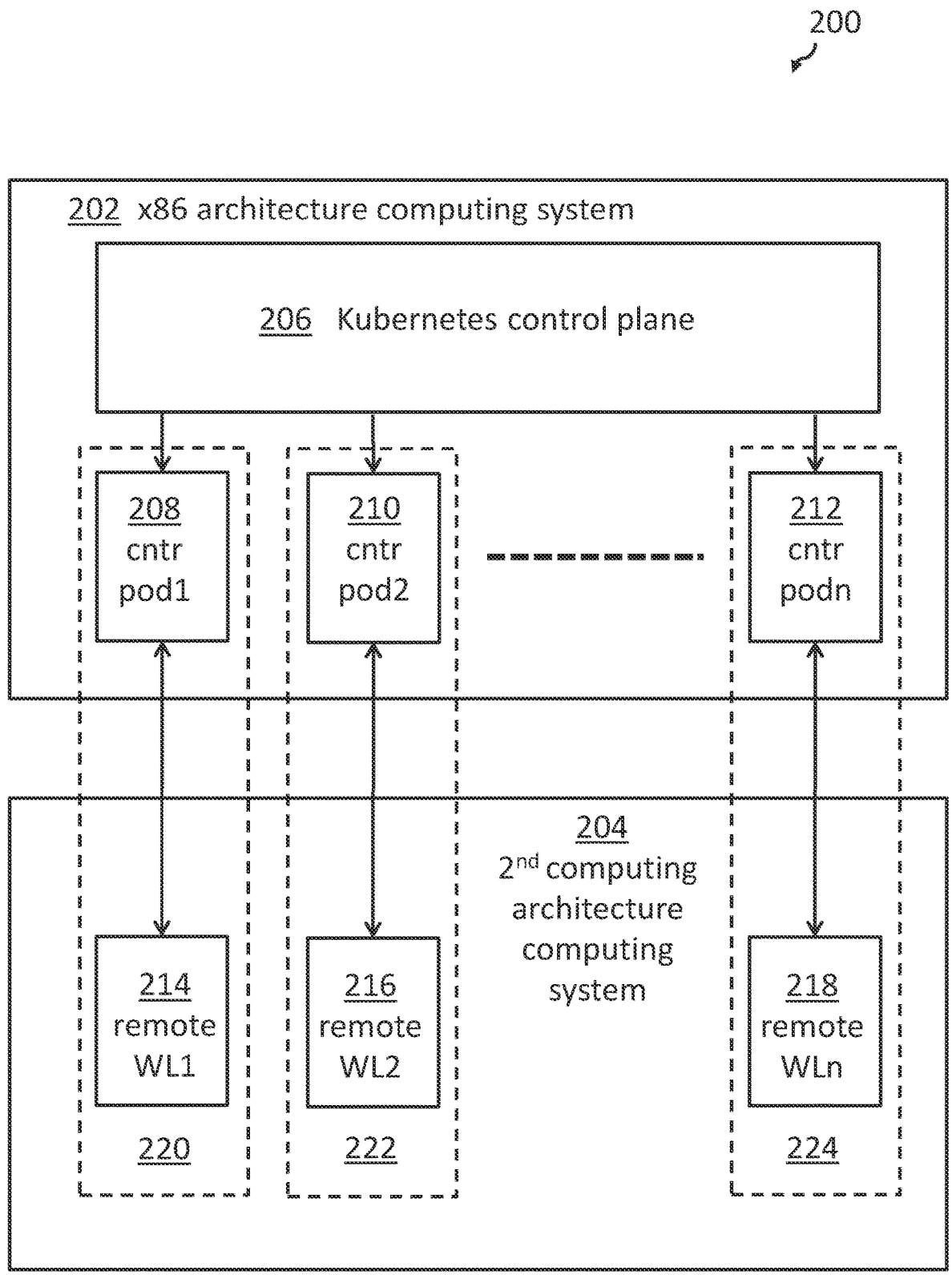

FIG. 2 shows a diagram of an embodiment of an overall architecture of the proposed concept.

Figure 3:
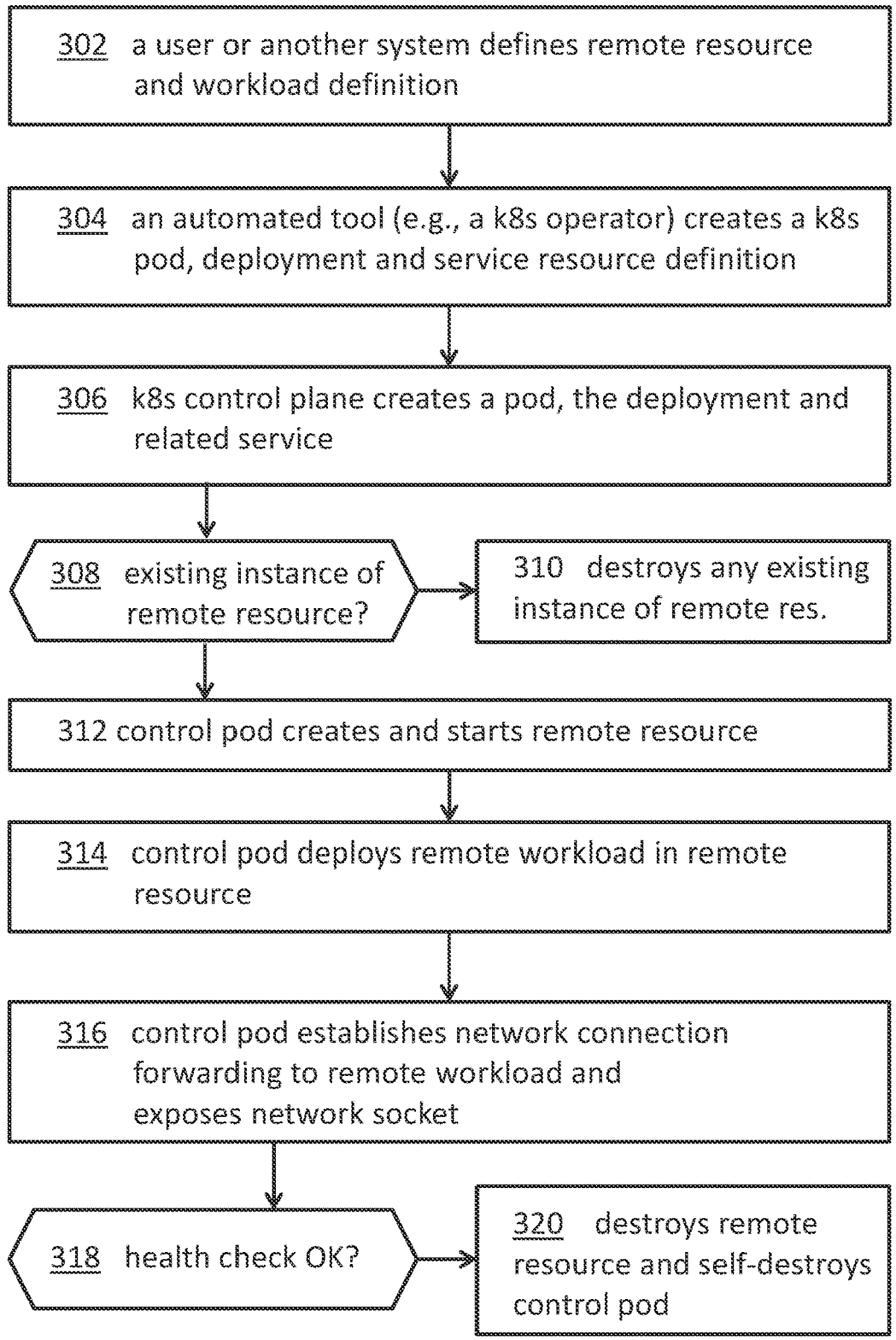

FIG. 3 shows a diagram of an embodiment of a more implementation-near flowchart for details of the proposed concept.

Figure 4:
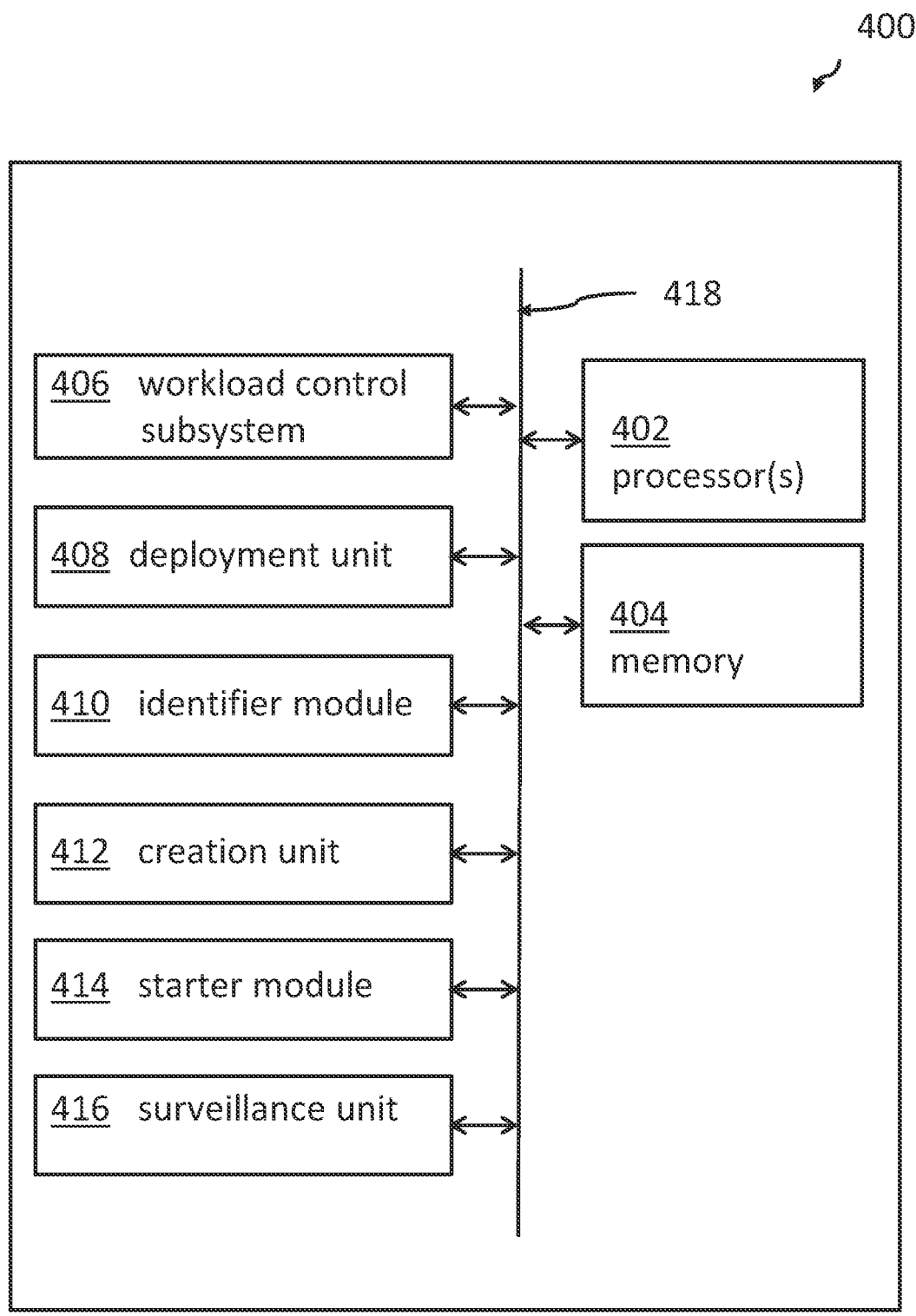

FIG. 4 shows a block diagram of an embodiment of the inventive workload management system designed for workloads of a first computing architecture enabled for a workload of a second computing architecture.

Figure 5:
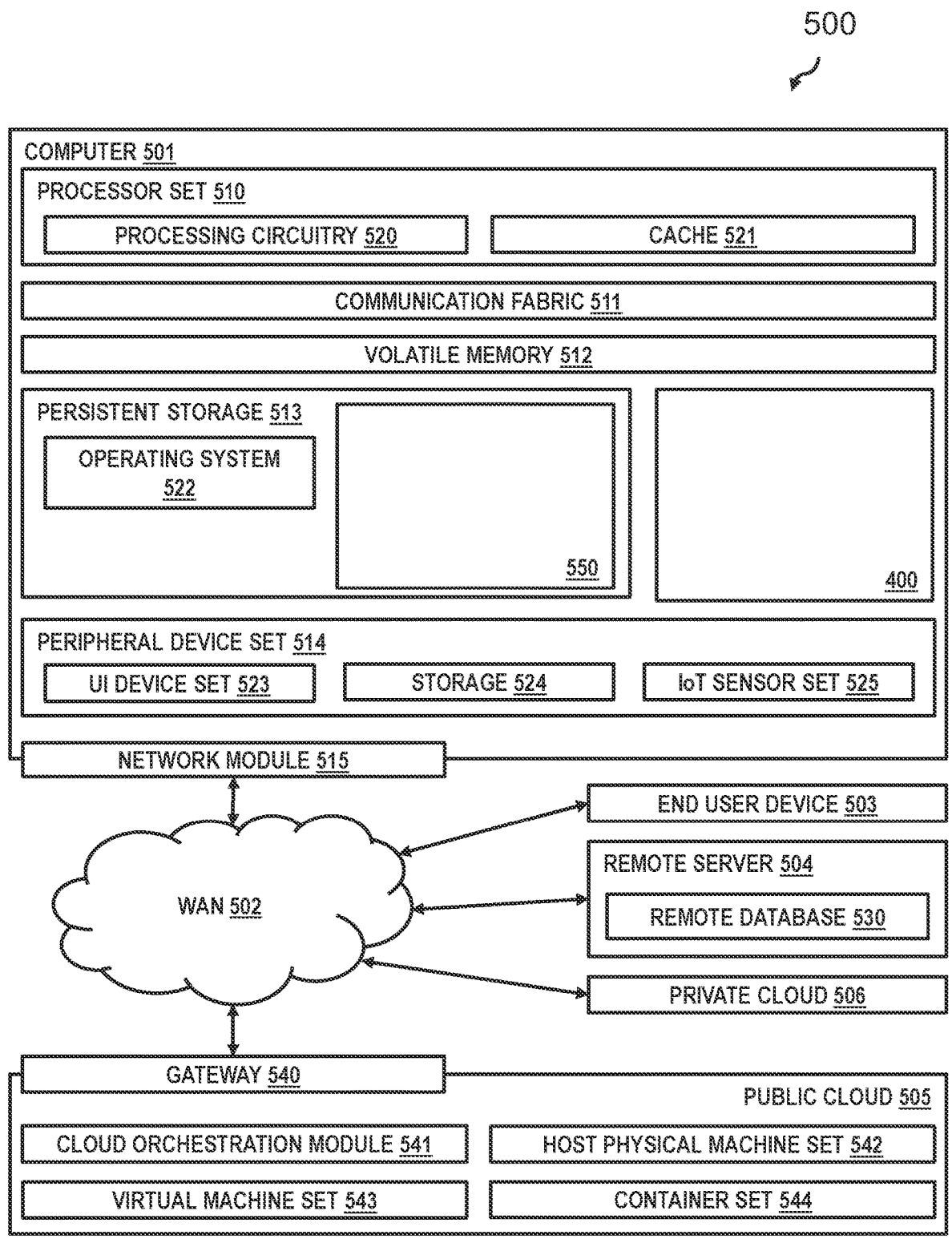

FIG. 5 shows an embodiment of a computing system comprising the system according to FIG. 4.

DETAILED DESCRIPTION

In the context of this description, the following technical conventions, terms and/or expressions may be used:

The term 'workload management system' may denote a system organizing and orchestrating a plurality of compute resources—like software containers or virtual machines or also hardware components—to optimize resources, shielding a lot of complex management tasks for a user and enabling resiliency of the underline computing environment, and enable a continuous operation, even if single compute resources may fail.

The term 'workload management control plane' may denote a control and operation platform like Kubernetes container management system in order to facilitate the characteristics described under the definition of the workload management system above. Here, 'Kubernetes' may refer to the known is an open-source container orchestration system for automating software deployment, scaling, and management. Google originally designed Kubernetes, but the Cloud Native Computing Foundation now maintains the project. It work with, e.g., Docker and is often referred to as k8s.

The term 'computing architecture' may denote a physical technical platform, here typically being expressed by the type of processor used. Examples may be the well-known x86 architecture (by Intel), the zSystems and the Power architecture (both by IBM), the ARM architecture (initiated by ARM) or the older and not so much used SPARC architecture. However, any other architecture may be used with the concept proposed here, even those for computing architectures used in IoT (Internet of Things) concepts.

The term 'requested remote workload' may denote a computing task to be performed for which a request may exist—initially being received by the workload management control plane operated under the first architecture—to be executed on the second architecture.

The term 'proxy compute resource' may denote, e.g., a software container executed under the control of the workload management control plane, e.g., a software container with the special capability of managing the remote workload for which no direct replacement exists for the first computing architecture.

The term '1:1 relationship' may denote here a direct "live-and-die" combination of the proxy compute resource and the remote workload. They may only exist together. I.e., if the remote workload may terminate its operation (for any reason) the proxy compute resource would also stop its operation by itself. It may then be restarted by the workload management control plane, which in turn would lead to the restart of the remote workload. If during this process it may become evident that a related remote workload may already exist, the proxy compute resource may stop the remote workload and restart the remote workload under new controlled conditions, e.g., using the same availability zone or other characteristics.

The term 'deployment characteristics' may denote all circumstances a pod may use as start parameters. This may comprise at least one of the following: availability zones, anti- and co-location with other workload components, network isolation attributes, security attributes, and Kubernetes deployment attributes.

In the following, a detailed description of the figures will be given. All instructions in the figures are schematic. Firstly, a block diagram of an embodiment of the inventive computer-implemented method for using a workload management system designed for workloads of a first computing architecture also for workloads of a second computing architecture is given. Afterwards, further embodiments, as well as embodiments of the workload management system designed for workloads of a first computing architecture enabled for a workload of a second computing architecture, will be described.

FIG. 1 shows a block diagram of a preferred embodiment of the computer-implemented method 100 for using a workload management system—e.g., Kubernetes—designed for workloads of a first computing architecture—e.g., x86 architecture—also for workloads of a second computing architecture, e.g., the zSystems architecture. The method 100 comprises deploying, 102, a workload management control plane—e.g., the Kubernetes control plane—under the first computing architecture, identifying, 104, by the workload management control plane, a requested remote workload only available for the second computing architecture.

If a resource workload can be detected on the network—e.g., on the Internet or a subset thereof by the workload management control plane—able to fulfil the requirement of the request, the method 100 comprises creating, 106, a proxy compute resource—e.g., a proxy container, i.e., a control pod (in the Kubernetes jargon) as interface for the requested remote workload by the workload management control plane.

Additionally, the method 100 comprises starting, 108, the remote workload by the proxy compute resource. Thereby, the remote workload can also be another workload management system controlling a plurality of compute resources.

Moreover, the method 100 comprises controlling 110, by the proxy compute resource, an operation of the remote workload in a 1:1 relationship. I.e., upon receiving a termination signal, in particular, for the proxy compute resource initiates that the remote workload is terminated by the proxy compute resource; afterwards, the proxy compute resource stops its own operation, i.e., it "kills itself". In return and upon a termination of the remote workload—in particular for any reason—the proxy compute resource is also stopped—i.e., "it kills itself". As next step, the Kubernetes control plane can create a new control pod/proxy compute resource which in turn can restart the remote workload. This can be seen as part of the resiliency of the proposed concept, i.e., the resiliency and operational continuity of the Kubernetes container concept is also extended to the remote workload under a different computing architecture.

FIG. 2 shows a diagram of an embodiment of an overall architecture 200 of the proposed concept. This diagram is using an x86 architecture computing system running the known Kubernetes container management system. Under the control of the Kubernetes control plane 206 (other control systems are equally possible), a plurality of software containers (not shown) on the x86 architecture computing system 202 as well as a plurality of proxy compute resources—here denoted as controlled pod1 208, pod2 210, . . . podn 212—can be managed and optimized. This may be performed in the known form of workload management systems, like, Kubernetes. Traditional pod or container are not shown in this figure. Hence, the proposed concept also enables a mix deployment, i.e., some of the software containers can be traditional software container and other are proxy compute resources. Hence, a mixture of traditional Kubernetes-managed container and new container—i.e., the proxy compute resources—can be managed in mixed-mode.

Additionally, the second computing architecture computing system 204 can also provide a plurality of workloads, namely remote WL1 214, remote WL2 216, up to remote WLn 218. The lines between the control pods 208, 210, 212 and respective remote workloads WLi, i=1, . . . n, should indicate the 1:1 relationship between a selected control pod (in Kubernetes semantics), i.e., the proxy compute resource, and the remote workload.

The dashed boxes 220, 222, 224 indicate that also in this architecture different availability zones may be defined as known from Kubernetes and other virtualized cloud computing resource management systems.

FIG. 3 shows a diagram of an embodiment of a more implementation-near flowchart 300 for details of the proposed concept. Firstly, a user or another system or process defines a remote resource of workload definition, 302. Then, an automated tool—e.g., a Kubernetes operator—creates, 304, service definitions and resource definitions for a Kubernetes control pod.

Next, the Kubernetes control plane (as an example for a workload management system) actually creates, 306, the control pod using the deployment and service definitions. When the created control pod detects, 308, a related existing instance of the remote resource, it terminates, 310 the existing instance of the remote resource along with other related resources. This may achieve—at least in parts by this feature—the 1:1 relationship between the proxy compute resource/control pod.

In any case, the control pod creates and starts, 312 now the remote resource and subsequently deploys, 314, the remote workload in the remote resource, i.e., under the second computing architecture. Furthermore, the controlled pod establishes, 316, network connections and forwards network traffic to the remote workload and exposes network sockets to the remote workload.

Afterwards, the control pod performs regular health checks for the remote workload. If any of the performed health checks fails, 318, the control pod stops and/or terminates (or destroys) 320 the remote resource and afterwards it self-destroys the control pod, i.e., the proxy compute resource.

As a result, the Kubernetes control plane can detect this failure restart provisioning new control pod/proxy compute resources guaranteeing continuity and resiliency of the entire system.

FIG. 4 shows a block diagram of an embodiment of the workload management system 400 designed for workloads of a first computing architecture enabled for a workload of a second computing architecture. The workload management system comprises a processor 402 and a memory 404, the memory 404 being operatively coupled to the processor 402, wherein the memory 404 stores program code portions, which, when executed by the processor 402, enable the processor 402 to deploy—in particular by a deployment unit 408—by a workload management control plane—in particular implemented as workload control subsystem 406—under a first computing architecture.

The processor 402 is further enabled to identify, using the workload management control plane—and in particular, by an identifier module 410—a requested remote workload only available for the second computing architecture, and to create, using the workload management control plane—and in particular, by a creation unit 412—a proxy compute resource as interface for the requested remote workload.

Furthermore, the processor 402 is further enabled to start, using the proxy compute resource—and in particular, a starter module 414—the remote workload in order to control, using the proxy compute resource—and in particular, a surveillance 416 unit—an operation of the remote workload in a 1:1 relationship, by: (i) upon a reception of a termination signal, terminating the remote workload by the proxy compute resource and self-terminating the proxy compute resource, and (ii) upon a termination of the remote workload terminating the proxy compute resource.

It shall also be mentioned that all functional units, modules and functional blocks—in particular, the processor 402, the memory 404, the workload subsystem 406, the deployment unit 408, the identifier module 410, the creation unit 412, the starter module 414, and the surveillance unit 416—may be communicatively coupled to each other for signal or message exchange in a selected 1:1 manner. Alternatively, the functional units, modules and functional blocks can be linked to a system internal bus system 418 for a selective signal or message exchange.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 5 shows a computing environment 500 comprising an example of an environment for the execution of at least some of the computer code involved in performing the inventive methods, such as the computer-implemented method for using a workload management system designed for workloads of a first computing architecture also for workloads of a second computing architecture 550.

In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction paths that allow the various components of computer

501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (e.g., embodiments that utilize software—defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501) and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

It should also be mentioned that the workload management system designed for workloads of a first computing architecture enabled for a workload of a second computing architecture can be an operational sub-system of the computer 501 and may be attached to a computer-internal bus system.

The terminology used herein is for the purpose of describing particular embodiments only and is not intended to limit the invention. As used herein, the singular forms a, an, and the, are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized by the following clauses:

1. A computer-implemented method for using a workload management system designed for workloads of a first computing architecture also for workloads of a second computing architecture, the method comprising
   deploying a workload management control plane under a first computing architecture,
   identifying, by the workload management control plane, a requested remote workload only available for the second computing architecture,
   creating, by the workload management control plane, a proxy compute resource as interface for the requested remote workload, some of us use this shows the—starting, by the proxy compute resource, the remote workload,
   controlling, by the proxy compute resource, an operation of the remote workload in a 1:1 relationship, by upon receiving a termination signal, terminating the remote workload by the proxy compute resource and self-terminating
   the proxy compute resource, and
   upon a termination of the remote workload
   terminate the proxy compute resource.
2. The method according to clause 1, also comprising monitoring, by the proxy compute resource continuously a correct operation of the remote workload.
3. The method according to clause 1 or 2, also comprising forwarding, by the proxy compute resource, network traffic to and from the remote workload.
4. The method according to any of the preceding clauses, wherein the starting the remote workload also comprises
   starting the remote workload with the same deployment characteristics, as specified by the received request.
5. The method according to any of the preceding clauses, wherein the starting the remote workload also comprises
   creating, by the proxy compute resource, resources required to operate the remote workload.
6. The method according to any of the preceding clauses, wherein the starting the remote workload also comprises
   upon determining an executing related remote workload, terminating the determined executing related remote workload with all associated resources.
7. The method according to any of the preceding clauses, wherein the first computing architecture is an x86 architecture.
8. The method according to any of the preceding clauses, wherein the second computing architecture is a zSystems architecture.

9. The method according to any of the preceding clauses, wherein the workload management system is a container management platform.
10. The method according to any of the preceding clauses, wherein a request of the remote workload to a storage system or I/O attachments is forwarded to and performed by the proxy compute resource.
11. A workload management system designed for workloads of a first computing architecture enabled for a workload of a second computing architecture, the workload management system comprising
a processor and a memory, the memory being operatively coupled to the processor, wherein the memory stores program code portions, which, when executed by the processor, enable the processor to
deploy a workload management control plane under a first computing architecture,
identify, using the workload management control plane, a requested remote workload only available for the second computing architecture,
create, using the workload management control plane, a proxy compute resource as interface for the requested remote workload,
start, using the proxy compute resource, the remote workload,
control, using the proxy compute resource, an operation of the remote workload in a 1:1 relationship, by
upon a reception of a termination signal, terminating the remote workload by the proxy compute resource and self-terminating the proxy compute resource, and
upon a termination of the remote workload terminate the proxy compute resource.
12. The workload management system according to clause 11, wherein the processor is also enabled to
monitor continuously, using the proxy compute resource, a correct operation of the remote workload.
13. The workload management system according to claim 11 or 12, wherein the processor is also enabled to
forward, using the proxy compute resource, network traffic to and from the remote workload.
14. The workload management system according to any of the clauses 11 to 13, wherein the processor is during the starting the remote workload also enabled to
start the remote workload with the same deployment characteristics, as specified by the received request.
15. The workload management system according to any of the clauses 11 to 14, wherein the processor is during the starting the remote workload also enabled to
create, using the proxy compute resource, resources required to operate the remote workload.
16. The workload management system according to any of the clauses 11 to 15, wherein the processor is during the starting the remote workload also enabled to
upon a determination of an executing related remote workload, terminate the determined executing related remote workload with all associated resources.
17. The workload management system according to any of the clauses 11 to 16, wherein the first computing architecture is an x86 architecture.
18. The workload management system according to any of the clauses 11 to 17, wherein the second computing architecture is a zSystems architecture.
19. The workload management system according to any of the clauses 11 to 13, wherein the workload management system is a container management platform.

20. A computer program product for using a workload management system designed for workloads of a first computing architecture, also for workloads of a second computing architecture, said computer program product comprising a computer readable storage medium having program instructions embodied therewith, said program instructions being executable by one or more computing systems or controllers to cause said one or more computing systems to
deploy a workload management control plane under a first computing architecture,
identify, using the workload management control plane, a requested remote workload only available for the second computing architecture,
create, using the workload management control plane, a proxy compute resource as interface for the requested remote workload,
start, using the proxy compute resource, the remote workload, on the—control, using the proxy compute resource, an operation of the remote workload in a 1:1 relationship, by
upon receiving a termination signal, terminating the remote workload by the proxy compute resource and self-terminating
the proxy compute resource, and
upon a termination of the remote workload terminate the proxy compute resource.

What is claimed is:
1. A computer-implemented method for using a workload management system designed for workloads of a first computing architecture for workloads of a second computing architecture, the method comprising:
deploying a workload management control plane under a first computing architecture;
identifying, by the workload management control plane, a requested remote workload only available for the second computing architecture;
creating, by the workload management control plane, a proxy compute resource as interface for the requested remote workload;
starting, by the proxy compute resource, the requested remote workload; and
controlling, by the proxy compute resource, an operation of the remote workload in a 1:1 relationship comprising:
upon receiving a termination signal, terminating the remote workload by the proxy compute resource; and
upon a termination of the remote workload, self-terminating by the proxy compute resource.
2. The method of claim 1, further comprising:
monitoring continuously, by the proxy compute resource, a correct operation of the remote workload.
3. The method of claim 1, further comprising:
forwarding, by the proxy compute resource, network traffic to and from the remote workload.
4. The method of claim 1, wherein the starting further comprises:
starting the remote workload with the same deployment characteristics, as specified by the received request.
5. The method of claim 1, wherein the starting further comprises:
ensuring, by the proxy compute resource, availability of resources required to operate the remote workload.

6. The method of claim 1, wherein the starting further comprises:
upon determining an executing related remote workload, terminating the executing related remote workload with all associated resources.

7. The method of claim 1, wherein the first computing architecture is an x86 architecture.

8. The method of claim 7, wherein the second computing architecture is a zSystems architecture.

9. The method of claim 1, wherein the workload management system is a container management platform.

10. The method of claim 1, wherein a request of the remote workload to a storage system or I/O attachments is forwarded to and performed by the proxy compute resource.

11. A workload management system designed for workloads of a first computing architecture enabled for a workload of a second computing architecture, the workload management system comprising:
a processor and a memory, the memory being operatively coupled to the processor, wherein the memory stores program code portions, which, when executed by the processor, enable the processor to:
deploy a workload management control plane under a first computing architecture;
identify, by the workload management control plane, a requested remote workload only available for the second computing architecture;
create, by the workload management control plane, a proxy compute resource as interface for the requested remote workload;
start, by the proxy compute resource, the requested remote workload; and
control, by the proxy compute resource, an operation of the remote workload in a 1:1 relationship, comprising:
upon reception of a termination signal, terminating the remote workload by the proxy compute resource; and
upon a termination of the remote workload, self-terminating by the proxy compute resource.

12. The workload management system of claim 11, wherein the processor is also enabled to:
monitor continuously, by the proxy compute resource, a correct operation of the remote workload.

13. The workload management system of claim 11, wherein the processor is also enabled to:
forward, using the proxy compute resource, network traffic to and from the remote workload.

14. The workload management system of claim 11, wherein the processor, during the start, is also enabled to:
start the remote workload with the same deployment characteristics, as specified by the received request.

15. The workload management system of claim 11, wherein the processor, during the start, is also enabled to:
ensure availability, using the proxy compute resource, of resources required to operate the remote workload.

16. The workload management system of claim 11, wherein the processor, during the start, is also enabled to:
upon a determination of an executing related remote workload, terminate the determined executing related remote workload with all associated resources.

17. The workload management system of claim 11, wherein the first computing architecture is an x86 architecture.

18. The workload management system of claim 17, wherein the second computing architecture is a zSystems architecture.

19. The workload management system of claim 11, wherein the workload management system is a container management platform.

20. A computer program product for using a workload management system designed for workloads of a first computing architecture, for workloads of a second computing architecture, the computer program product comprising:
a computer readable storage medium having program instructions embodied therewith, the program instructions being executable by one or more computing systems or controllers to cause the one or more computing systems to:
deploy a workload management control plane under a first computing architecture;
identify, using the workload management control plane, a requested remote workload only available for the second computing architecture;
create, using the workload management control plane, a proxy compute resource as interface for the requested remote workload;
start, using the proxy compute resource, the remote workload; and
control, using the proxy compute resource, an operation of the remote workload in a 1:1 relationship, comprising:
upon receiving a termination signal, terminating the remote workload by the proxy compute resource; and
upon termination of the remote workload, self-termination by the proxy compute resource.

* * * * *